United States Patent
Lei et al.

(10) Patent No.: US 10,276,163 B1
(45) Date of Patent: *Apr. 30, 2019

(54) SPEECH RECOGNITION PARAMETER ADJUSTMENT

(71) Applicant: Google LLC, Mountain View, CA (US)

(72) Inventors: Xin Lei, Sunnyvale, CA (US); Patrick An Phu Nguyen, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,893

(22) Filed: Jun. 29, 2016

Related U.S. Application Data (63) Continuation of application No. 14/064,399, filed on Oct. 28, 2013, now abandoned, which is a continuation of application No. 13/649,747, filed on Oct. 11, 2012, now Pat. No. 8,600,746.

(60) Provisional application No. 61/698,928, filed on Sep. 10, 2012.

(51) Int. Cl.
*G10L 15/26* (2006.01)
*G10L 15/30* (2013.01)

(52) U.S. Cl.
CPC .............. *G10L 15/26* (2013.01); *G10L 15/30* (2013.01)

(58) Field of Classification Search
CPC ......... G10L 15/22; G10L 15/28; G10L 15/30; G10L 2015/226; G10L 15/26
See application file for complete search history.

(56) References Cited

U.S. PATENT DOCUMENTS

| | | | |
|---|---|---|---|
| 7,024,366 B1 * | 4/2006 | Deyoe | G10L 15/22 704/246 |
| 7,716,047 B2 | 5/2010 | Hernandez-Abrego et al. | |
| 2004/0078198 A1 * | 4/2004 | Hernandez-Abrego | G10L 15/28 704/231 |
| 2007/0083374 A1 | 4/2007 | Bates et al. | |
| 2011/0153620 A1 * | 6/2011 | Coifman | G10L 15/065 707/748 |

OTHER PUBLICATIONS

Anusuya, M.A. et al., "Speech Recognition by Machine: A Reivew," (IJCSIS) International Journal of Computer Science and Information Security, vol. 6., No. 3, 2009, 25 pages.

"Tuning," downloaded from the internet on Oct. 11, 2012 at http://developers.voiceobjects.com/docs/en/VO9/004-tuning.htm, 12 pages.

(Continued)

*Primary Examiner* — Angela A Armstrong
(74) *Attorney, Agent, or Firm* — Fish & Richardson P.C.

(57) ABSTRACT

Audio data that encodes an utterance of a user is received. It is determined that the user has been classified as a novice user of a speech recognizer. A speech recognizer setting is selected that is used by the speech recognizer in generating a transcription of the utterance. The selected speech recognizer setting is different than a default speech recognizer setting that is used by the speech recognizer in generating transcriptions of utterances of users that are not classified as novice users. The selected speech recognizer setting results in increased speech recognition accuracy in comparison with the default setting. A transcription of the utterance is obtained that is generated by the speech recognizer using the selected setting.

20 Claims, 4 Drawing Sheets

(56) References Cited

OTHER PUBLICATIONS

Office Action issued in U.S. Appl. No. 13/649,747 dated Feb. 28, 2013, 14 pages.
Office Action issued in U.S. Appl. No. 13/649,747 dated Aug. 5, 2013, 9 pages.
Notice of Allowance issued on U.S. Appl. No. 13/649,747 dated Sep. 13, 2013, 6 pages.
Office Action issued in U.S. Appl. No. 14/064,399 dated Jul. 6, 2015, 12 pages.
Office Action issued in U.S. Appl. No. 14/064,399 dated Dec. 14, 2015, 10 pages.

\* cited by examiner

FIG. 4 ions may include one or more of the following features. The selected speech recognizer setting result in increased speech recognition latency in comparison with the default setting. The method further includes determining that the user has been classified as a novice user of a speech recognizer includes determining a size of data that the speech recognizer has collected for the user and determining that the size does not satisfy a threshold. The method further includes determining that the user has been classified as a novice user of a speech recognizer includes determining a duration of data that the speech recognizer has collected for the user and determining that the duration does not satisfy a threshold. Determining that the user has been classified as a novice user of a speech recognizer includes determining that the user has never before interacted with the speech recognizer. Determining that the user has been classified as a novice user of a speech recognizer includes determining a number of previous speech recognition sessions associated with the user and determining that the number of previous speech recognition sessions does not satisfy a threshold. Determining that the user has been classified as a novice user of a speech recognizer includes determining that the utterance is clipped in the audio data. Selecting the speech recognizer setting includes using a beam pruning parameter that is larger than the beam pruning parameter of the default setting. Selecting the speech recognizer settings comprise determining a setting value based on a calculated experience measure of the user. Selecting the speech recognizer setting includes selecting a language model that is larger than a language model that is used by the speech recognizer in generating transcriptions of utterances of users that are not classified as novice users. The user is classified as a novice user using a binary classifier that classifies users as either novice users or experienced users. Selecting a speech recognizer setting includes adjusting an endpoint parameter. Selecting a speech recognizer setting includes tuning a speed-versus-accuracy parameter to favor increased accuracy and decreased speed. Selecting a speech recognizer setting includes tuning a complexity-and-accuracy parameter to favor increased accuracy and increased complexity. The method further includes receiving additional audio data that encodes an additional utterance of the user; determining that the user has been reclassified as an experienced user of the speech recognizer; and obtaining a transcription of the additional utterance that is generated by the speech recognizer using the default recognizer setting. Selecting the speech recognizer setting includes selecting an acoustic model that is larger than an acoustic model that is used by the speech recognizer in generating transcriptions of utterances of users that are not classified as novice users. Selecting the speech recognizer setting includes selecting one or more translation machines that are more powerful than machines of the default setting.

Advantageous implementations may include one or more of the following features. Novice users of a speech recognition system can be provided with a more accurate translation than experienced users. Experienced users, on the other hand, can be given a faster translation than the novice users. The user experience of a user that goes from a novice to experience user can be improved. User-specific training information can be gathered from a user while they are a novice user and applied to recognition tasks when the user is an experienced user. System resources for speech recognition can be allocated to provide improved user experiences to a diverse user population.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements

DETAILED DESCRIPTION

A server may receive speech recognition request from many different users. These users may have a range of experience with speech recognition technologies, and may value some aspects of speech recognition differently. For example, it may be that novice users have a better user experience if their speech recognition tasks sacrifice speed for accuracy, while a more experienced user may have a better user experience if their speech recognition tasks sacrifice accuracy for speed.

To classify a user as a novice or experienced user, the speech recognition server may evaluate the volume of usage by each user. When a system determines that user has made few or no recognition requests, or when the length or data size of all speech provided by the user is small, the user may be classified as a novice. As the number of requests or length of speech for that user grows, the user may be reclassified as an experienced user. As such, the speech recognition may select speech recognition settings for a particular user that favor accuracy if the user is identified as novice and speech recognition settings that favor speed if the user is identified as experienced.

Figure 1:
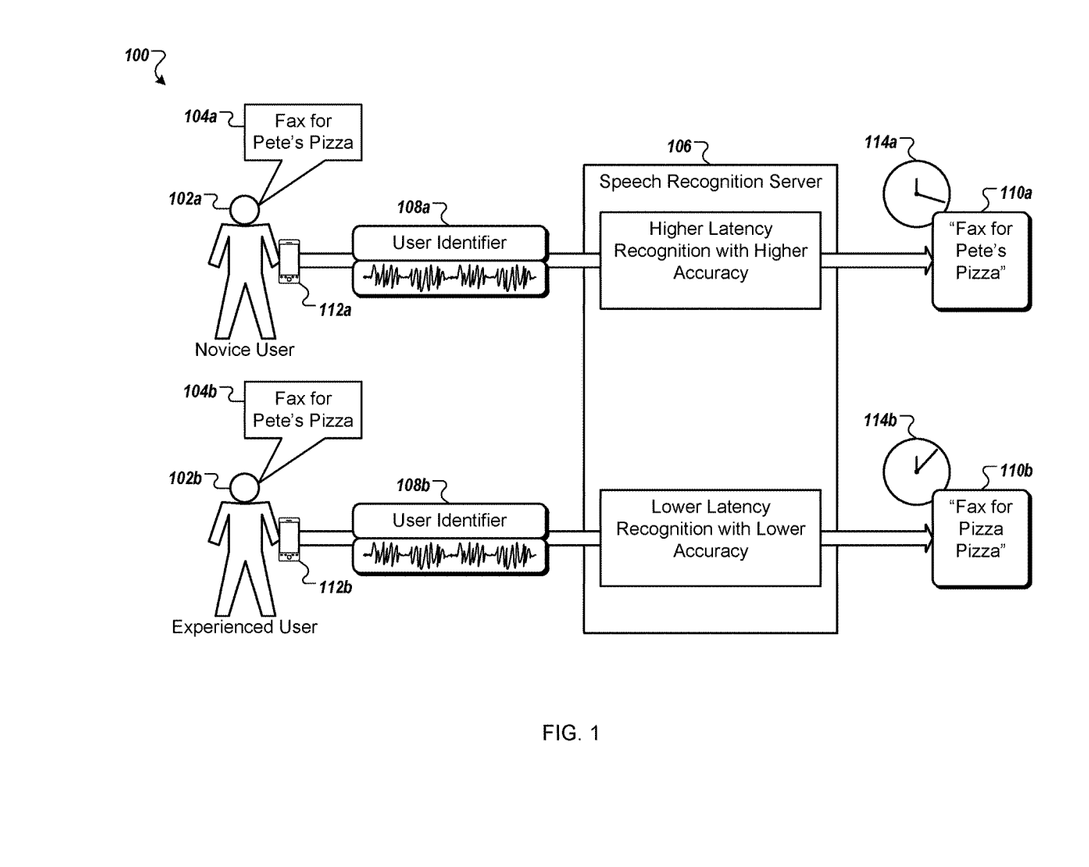
FIG. 1 is a diagram of an example system in which a speech recognition server provides a more accurate transcription to a novice user, and a faster transcription to an experienced user.

FIG. 1 is a diagram of an example system 100 in which a speech recognition server 106 provides a more accurate transcription to a novice user, and a faster transcription to an experienced users. Specifically, users 102 submit utterances 104 to a speech recognition server 106 for recognition. In this example, the user 102a is a novice user and is provided with a recognition that exhibits increased latency, but may be more accurate, than the recognition provided to the user 102b, who is an experienced user.

In general, the speech recognition server 106 may receive speech recognition requests 108 from users in a large user base. The speech recognition server 106 may, in response to each request 108, generate a text result 110 of one or more recognition processes run on the request 108 by the speech recognition server 106. Although two users 102a and 102b are shown for clarity, the speech recognition server 106 may receive requests 108 from a much larger number of users (e.g. tens of thousands), and may process some or all of the received requests 108 in parallel, providing each user 102 with a text result 110 while other requests 108 are being received and processed.

Additionally, the speech recognition server 106 may be any type of appropriate system to perform speech recognition tasks. For example, the speech recognition server 106 may be constituted by a group of virtual machines or jobs running on a massively distributed computing environment that is also hosting virtual machines or jobs for different services, tasks, or applications. In some implementations, the speech recognition server 106 may a component of a large system of servers or services, or may be only one of many services offered in conjunction with some product or service.

The speech recognition server 106 may have, or have access to, a user profile associated with each user 102. This user profile, which may be anonymized such that the speech recognition server 106 does not have access to any user information, may provide the speech recognition server 106 with information to classify each user. For example, the requests 108 may include a user identifier of the user or device that generated the request 108. The speech recognition server 106 may use this unique identifier to access a profile with the same user identifier. In another case, the speech recognition server 106 may user other types of data to identify the user (e.g. a group of non-unique metadata values from the request).

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

From the user profile, the speech recognition server 106 may classify a user 102. For example, the profile may include a count of the number of times that the user has requested speech recognition services and/or may include the total length of time of all utterances that have been recognized for the user. If, for example, either or both of these values are below associated threshold values, a user 102 may be classified by the speech recognition server 106 as a novice. If either or both of these values are higher than their associated threshold values, a user 102 may be classified by the speech recognition server 106 as an experienced user. Other metrics are possible. In some cases, the experienced user may be considered the default user type for whom default speech recognition is used. In some cases, the threshold values may be set to 0 so that a user is only classified as a novice the first time they use the system, or if user profile information is unavailable.

In some cases, it may be determined that, compared to a baseline with no experienced-based adjustments, the user experience may be improved if a user 102 is given more accurate recognition initially (e.g. when classified as a novice) and then faster recognition as the user 102 becomes more experienced (e.g. when classified as an experienced user). There are a number of possible factors that may factor into this determination. For example, some users may learn to alter their speaking style when using the speech recognition server 106 in a way that increases accuracy of machine recognition. New users that are unsure of the value of speech recognition technology may be put at ease if their first few attempts at speech recognition result in accurate translations, while experienced user may opt to use speech input over typing input in order to increase their productivity in which case speed may be more desirable. Further, as a user 102 uses the speech recognition server 106, user-specific training data may be collected, allowing the speech recognition server 106 to run smaller, less accurate, faster models with better input data, providing both speed and accuracy to an experienced user 102b.

FIG. 1 illustrates be two users of the speech recognition server 106, specifically the novice user 102a and the experienced user 102b. The novice user 102a and the experienced user 102b may be different users, they may be the same user 102 over time, going from the novice user 102a to the experienced user 102b.

The novice user 102a speaks an utterance 104a ("Fax for Pete's Pizza") into a computing device 112a (e.g. a mobile computing device, tablet computer, wearable computer, e-book reader, desktop computer, laptop computer, etc.). The computing device 112a may be running, for example, a text editor with a speech recognition input, a search-bar with free-form speech input, or any other appropriate program. The computing device 112a may generate the request 108a, containing a user identifier and a data file that encodes the utterance 104a, and may transmit the request 108a to the speech recognition server 106.

The speech recognition server 106 may use the user identifier, or any other appropriate data available, to identify the user 102a. Data about the user 102a may be examined by the speech recognition server 106 in order to estimate the experience level of the user 102a. In this case, the speech recognition server 106 classifies the user 102a as a novice user.

Once the speech recognition server 106 classifies the user 102a as a novice user, the speech recognition server 106 may create a speech recognition task to process the utterance of the request 108a. The speech recognition server 106 may select or adjust one or more parameters of the task in favor of accuracy over speed. For example, a beam-pruning parameter for the speech recognition task may be turned off. With these parameters set, the speech recognition server 106 may then process the speech recognition task and produce the text result 110a.

Generally, the text results 110a may include a character string or other text representation that represent the speech recognition server's 106 top hypothesis of the contents of the utterance of the request 108a. Other information may be included in the text results 110a. For example, the speech recognition server 106 may include one or more alternative recognition results, confidence values for recognition results, and/or timestamp or processing time information. The speech recognition server 106 may pass the text results 110a back to the computing device 112a, or to another computer system, as appropriate.

The experienced user 102b speaks an utterance 104b of the same words ("Fax for Pete's Pizza") into a computing device 112b. The computing device 112b may generate the request 108b, and may transmit the request 108b to the speech recognition server 106.

Similar to in the prior example use, the speech recognition server 106 may use the user identifier, or any other appropriate data available, to classify the user 102b, in this case as an experienced user. Once the speech recognition server 106 classifies the user 102a as an experienced user, the speech recognition server 106 may create a speech recognition task to process the utterance of the request 108b. The speech recognition server 106 may select or adjust one or more parameters of the task in favor of speed as opposed to accuracy as in the previous example use. For example, the beam-pruning parameter for this speech recognition task may be turned on or set. With these parameters set, the speech recognition server 106 may then process the speech recognition task and produce the text result 110b.

Although the users 102a and 102b have submitted similar utterances containing the same words, the text results 110a and 110b differ. In the case of the text results 110a for the novice user 102a, the text result 110a is more accurate, as indicated in the figure by the text of the text result 110a matching the text of the utterance 104a. However, the time taken to produce the text result 110a is greater than time taken to produce the text result 110b, as indicated by the later time shown on the clock 114a compared to the clock 114b. Similarly, while the text result 110a was produced faster, it is less accurate than the text result 110a, as indicated by the text result 110b containing different words than the utterance 104b. It will be understood that, while an ideal result would be both fast and accurate, such a situation is not always available, and careful selection of trade-offs may result in high levels of user satisfaction within the constraints of computational limitations.

The system 100 may be used as a component in a number of different products or services. For example, the text results 110 may be passed as input to another hosted application such as a web or document search, particularly one that accepts free-form search queries. In another example use, the computing device 112 may be a low powered or computationally limited device that nonetheless has the input and output hardware for dictation-based word processing. By offloading the speech recognition to the speech recognition server 106, the computing device may be able to provide the user 102 with dictation-based word processing without expending the battery power and/or processing power needed for speech recognition. In still another example, a user 102 may have many different computing devices 112 (e.g. a cell phone, a tablet, a work computer and a home computer). If each of these computing devices 112 use the speech recognition server 106 for speech recognition, the user 102 may be provided with a consistent user experience regardless of the computing device 112 used.

Alternatives and extensions to the example system 100 are possible. For example, instead of processing the request 108a more slowly, the speech recognition server 106 may allocate additional computing resources to speech recognition tasks associated with a user 102 that has been classified as a novice. Many speech recognition tasks are highly parallelizable. That is, the operations may be spread over many processors working in parallel. If, for example, the speech recognition server is in an elastic computing environment in which hardware resources may be allocated to different task, the speech recognition server 106 may allocate more resources to the more complex tasks for novice users 102a than for the less complex tasks for the experienced users 102b.

Similarly, the text results 110b for the experienced users 102b may not necessarily be less accurate than the text results 110a. For example, some experienced users 102b have voices that may be more easily analyzed than some novice users 102a, and some experienced users 102b are practiced at forming utterances 104b in ways that make them easier to analyze. Additionally, the speech recognition server 106 may use historical utterances for users 102 to build user-specific training data that may increase the resulting accuracy of speech recognition processes that are computationally less accurate, due to the fact that more input data is available.

The speech recognition server 106 may be configured to identify more than two categories of users. For example, additional experience-related categories may be defined (e.g. novice, intermediate, and experienced), each with associated speed-to-accuracy parameter values. Users may also be additionally partitioned based on factors other than experience. For example, paying users 102 may be given access to parameter settings that are not available to free or trial users 102, or users in a particular geographic area (and thus likely to have a particular accent) may have speed-to-accuracy parameters adjusted based on location (e.g. if an utterance in the accent is particularly easy or hard to recognize).

Instead of discrete categorizations, a continuous experience value may be calculated for each user 102 using, for example, the same data as would be used for categorization. For example, the speech recognition server 106 may assign a user 102 with 5 requests totaling 38 seconds of utterances an experience value of 190 (that is, 5*38) and a user with 1,895 request totaling 14,402 seconds of utterances an experience value of 27,291,790 (that is, 1,895*14,402). The speech recognition server 106 may then use these experience values may be used for setting parameters in speech recognition tasks for the users 102.

Figure 2:
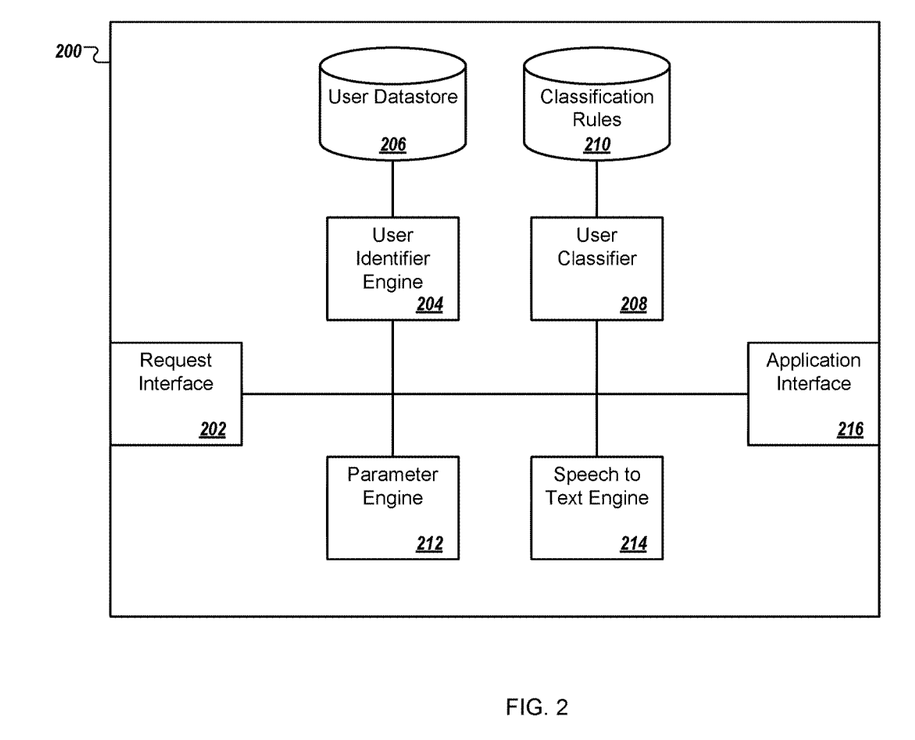
FIG. 2 is a diagram of a computer system for providing a speech recognition service.

FIG. 2 is a diagram of an example of a computer system 200 for providing a speech recognition service. For example, the computer system 200 may be used by the speech recognition server 106 to provide speech recognition services to the users 102. The computer system 200 may be configured, for example, to process a speech recognition task slowly with high accuracy or quickly with lower accuracy.

A request interface 202 may receive speech recognition requests from sources outside of the computer system 200. For example, the request interface 202 may be address with a Universal Resource Identifier (URI) and may expose one or more communication interfaces to receive the speech recognition requests from client computers. The client computers may be connected to the computer system 200 via a computer network such as the Internet.

A user identifier engine 204 may take information extracted from a speech recognition request and identify a user profile, stored in a user datastore 206, that matches the information from the speech recognition request. In some cases, the user datastore 206 may store user information for a number of services beyond just speech recognition. For example, a company may provide email, hosted storage, web searching, and/or hosted applications that all share an integrated user authentication system. Users' data, regardless of the particular service being used when it is generated, may be stored in the user datastore 206. As such, the user datastore 206 may have privacy and security policies that restrict the kinds and types of data available to the user identifier engine. For example, the user identifier engine 204 may be designed not ask for user information that is not needed for speech recognition, and the user datastore 206 may be configured to, for example, deny such a request and to alert an administrated of an attempt to request unauthorized information.

A user classifier 208 can examine user information, provided by the user identifier engine 204, to apply a classification to the user of a request. For example, the user classifier 208 can compare information about to the user to one or more classification rules 210 to determine the user's classification. The classification rules 210 may hold rule that include, for example, of one or more threshold values. If some information about the user is less or greater than a threshold value, then the user may be classified as a novice or experienced user. In general, the format of the classification rules 210 may depend in part on the type of data stored in the user datastore 206.

In some cases, the user classifier 208 may also use other data in classifying the user. In some implementations, the user classifier 208 may extract some information from speech recognition requests for comparison with classification rules. For example, the user classifier 208 may examine the utterance file to determine if there is a pause after each word. The presence of clipping at the beginning of the utterance encoding may also be one of the factors considered. For example, some new users may speak before the microphone of their device is turned on.

A parameter engine 212 can set one or more speech recognition parameters for a speech recognition task to recognize speech submitted by a user. Some or all of these parameters may affect the balance between speed and accuracy of the recognition task. Of these parameters, the parameter engine 212 may set them in favor of accuracy for a novice-classified user and in favor of speed for an experienced-classified user. In some cases, the parameter engine may use other information about the user to set some parameters, and may set parameters that are not related to the speed-accuracy trade off. For example, a user may be listed as being fluent in English and Spanish, in which case a parameter for an English language model and a Spanish language model can be enabled. Some of the example parameters that the parameter engine 212 may set include, but are not limited to, beam punning, size of acoustic or language models, power of machines selected (e.g. extra cost of operation), the number of working hypotheses, the number and/or type of concurrent recognition engines to run, vocabulary size to be used, sensitivity parameter, N best list length parameter, timeout parameter, and/or maximum search duration parameter.

A speech to text engine 214, or optionally a front-end to a group of voice to text engines, can collect a speech recognition request and related information in the computer system 200 and launch one or more recognition tasks to create text results for the request. For example, the speech to text engine 214 may use the request utterance and parameters specified by the parameter engine to select one or more language models, voice parameters, and other elements needed to run a speech to text task based on the specified parameters. The task may be queued, monitored, paused, aborted, and restarted by the speech to text engine 214 as needed, and can ultimately produce a text result for the speech recognition request.

A application interface 216 can take the text result and pass it out of the computer system 200 to the appropriate receiving application. For example, the application interface 216 may return the text result to the computer system that submitted the recognition request to the request interface 202. In another example, the application interface 216 may identify a different computer system that should receive the text result. This different computer system maybe specified, for example, by the recognition request or data in the user datastore 206.

Figure 3:
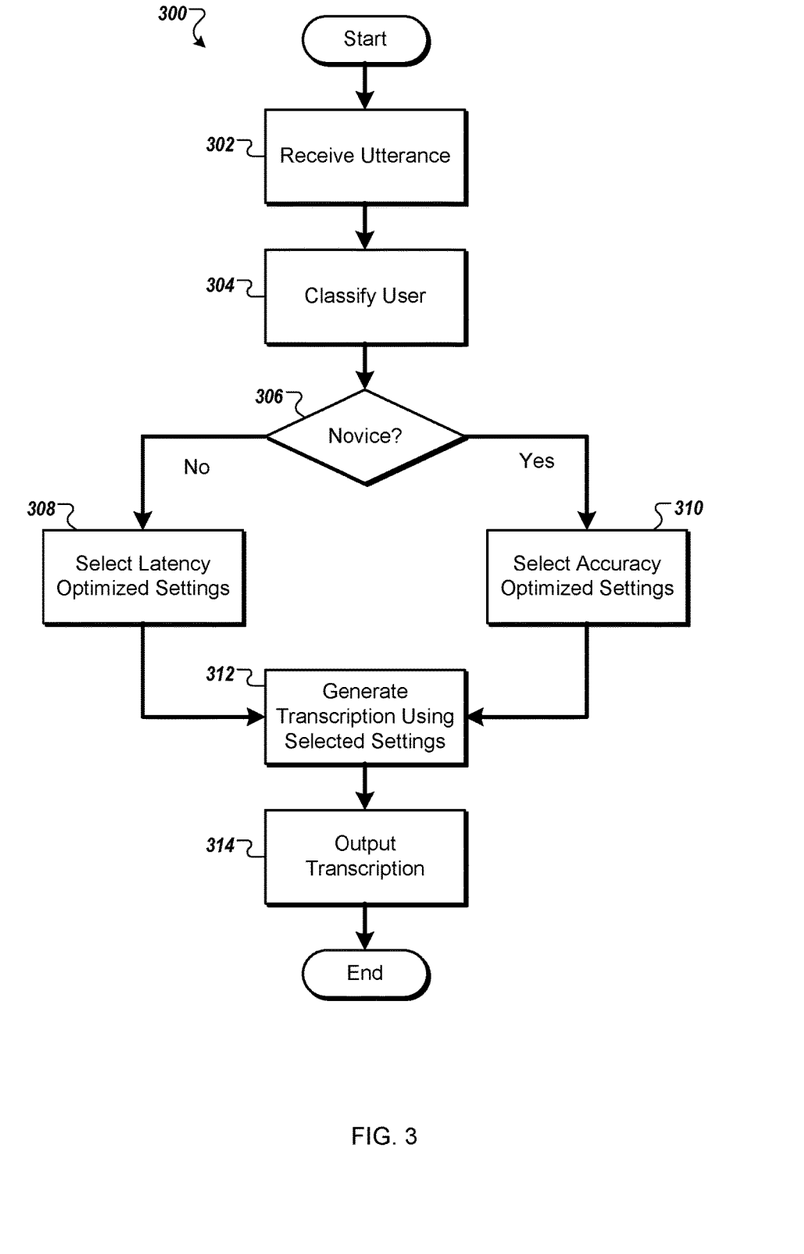
FIG. 3 is a flow chart illustrating an example process for recognizing speech from novice and experienced users.

FIG. 3 is a flow chart illustrating an example process 300 for recognizing speech from novice and experienced users. For clarity of discussion, the process 300 will be described in terms of the computer system 200. However, it will be understood that another system, or combination of systems, may also be used to perform the process 300 or other processes for recognizing speech from novice and experienced users.

An utterance is received (302). For example, the request interface 202 may receive a message from a remote computing device. The message may include at least an encoded utterance (e.g. an audio file or a stream of audio data) and a request to produce a transcript of the utterance. Other metadata may be included in the request as well. For example, authentication information such as an OAuth token, destination indicating the address of a computer device or program to receive the transcript, or other information may be included with the request. In some cases, the user may not be explicitly identified, but the information from the request may implicitly identify or indicate a user. For example, some combination of IP address, device identifier, user-agent string, and/or other data may be produced by only a small number of possible users.

The user is classified (304). For example, if the user is explicitly identified, as may be the case with an OAuth token, the user identifier engine 204 may look up the user's information in the user datastore 206. If the user is implicitly identified, as may be the case with a combination of IP address, device identifier, and user-agent string, the user identifier engine 204 may make a best effort to identify the user from the data in the user datastore 206. In part due to the possibility of an implicit identification being incorrect, the computer system 200 may be configured such no sensitive user data (e.g. real name, financial information) may be used by the user identifier engine 204, only anonymous information related to speech recognition (e.g. number of times using the computer system 200 for speech recognition) may be used. In the case that records of the user of the request do not currently exist, such as for a new user using the computer system 200 for the first time, a new entry may be created for that user.

Based on the user information from the user datastore 206 that is available to the user identifier engine 204, the user classifier 208 may identify the user as a novice. For example, if the user is a new user, or has less than a threshold number, length, or data size of utterances submitted to the computer system, the user classifier 208 may classify the user as a novice.

In some implementations, the user classifier 208 may classify the user as an experienced user if the user is not classified as a novice. In other implementations, a user not classified as a novice by the user classifier 208 may be unclassified and treated as a default user. This configuration may be preferable, for example, if only a subset of all incoming recognition requests are examined to determine novice status for special handling.

If the user is not classified as a novice user (306), latency optimized settings are selected (308). For example, the parameter engine 212 can select one or more parameters that favor speed of recognition over accuracy. In some configurations, the parameter engine may specify a language model to be used. For example, the parameter engine 212 may select a small language model to be used. In some implementations, larger language models, with more uncommon words or usage rules may result in a more accurate recognition result, but at the cost of recognition speed. In these cases, the parameter engine 212 may select a smaller language model. If the user is classified as a novice user (306), accuracy optimized settings are selected (310). For example, the parameter engine 212 may select the larger language model, sacrificing speed for accuracy.

A transcript is generated using the selected settings (312). For example, the voice to text engine 214 may run a recognition task on the received utterance, using the parameters set by the parameter engine 212. In addition to generating a transcript of the utterance, the voice to text engine 214 may also generate, for example, a confidence value, user-related training data to be stored in the user datastore 206, and/or other information. The transcript is output (314). For example, the application interface 216 may pass the transcript and some or all of the other information to a recipient that was specified by the recognition request or in the user datastore 206.

Figure 4:
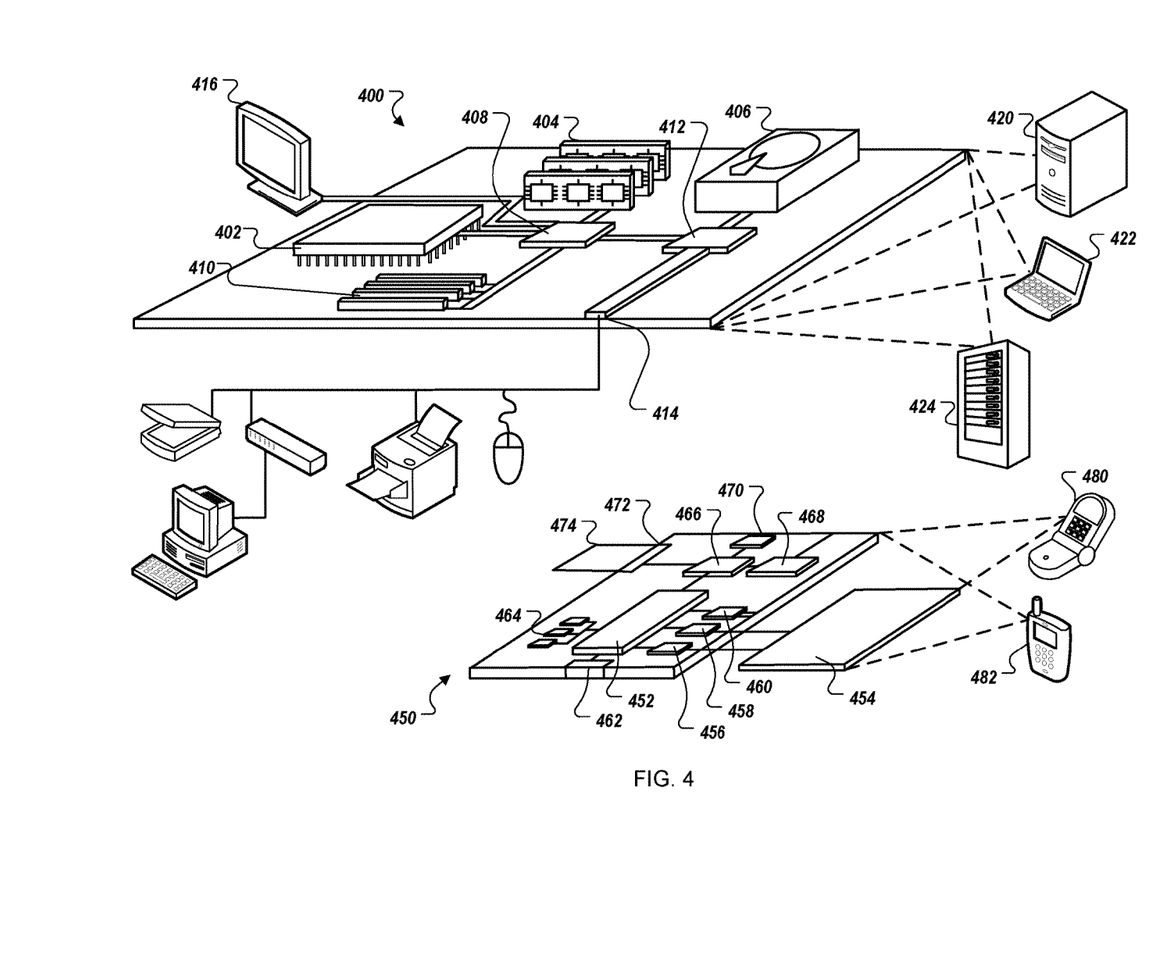
FIG. 4 is a schematic diagram that shows an example of a computing device and a mobile computing device.

FIG. 4 shows an example of a computing device 400 and an example of a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
receiving audio data corresponding to an utterance of a user whose user profile indicates is a first type of user;
after the audio data corresponding to the utterance has been received, classifying the user as the first type of user, then selecting a first set of speech recognition setting values that is associated with users of the first type for use by an automated speech recognizer in generating a transcription of the utterance, the first set of speech setting values being different than a second set of speech recognition setting values that is associated with users of a second type, the first set of speech recognition setting values favoring increased accuracy over reduced latency of the transcriptions that are generated by the automated speech recognizer, and the second set of speech recognition setting values favoring reduced latency over increased accuracy of the transcriptions that are generated by the automated speech recognizer;
dynamically configuring the automated speech recognizer to process the previously-received audio data using the first set of speech recognition setting values;
processing, for recognition, by the dynamically configured automated speech recognizer the previously-received audio data corresponding to the utterance of the user whose user profile indicates is the first type of user;

obtaining, based on the automated speech recognizer using the first set of speech recognition setting values, a transcription of the utterance that is more accurate and is obtained with greater latency than a different transcription of the utterance that would otherwise be obtained were the same audio data processed for the user had the user profile indicated that the user is the second type of user; and providing the obtained transcription for output.

2. The method of claim 1, wherein the first type of user is a novice user.

3. The method of claim 1, wherein the second type of user is an expert user.

4. The method of claim 1, wherein receiving audio data corresponding to an utterance of a user whose user profile indicates is a first type of user comprises:

receiving audio data from a microphone of a mobile computing device.

5. The method of claim 1, wherein processing, for recognition, the audio data corresponding to the utterance of the user whose user profile indicates is the first type of user comprises:

providing the audio data to a speech recognition server.

6. The method of claim 1, wherein obtaining a transcription of the utterance that is more accurate and is obtained with greater latency than a different transcription of the utterance that would otherwise be obtained were the same audio data processed for the user had the user profile indicated that the user is a second type of user is based at least on an indication in the user profile that the user is a first type of user.

7. The method of claim 1, wherein obtaining a transcription of the utterance that is more accurate and is obtained with greater latency than a different transcription of the utterance that would otherwise be obtained were the same audio data processed for the user had the user profile indicated that the user is a second type of user is based at least on an identifier of a mobile computing device that submits the audio data for recognition.

8. The method of claim 1, wherein obtaining a transcription of the utterance that is more accurate and is obtained with greater latency than a different transcription of the utterance that would otherwise be obtained were the same audio data processed for the user had the user profile indicated that the user is a second type of user is based at least on an identifier of the user.

9. A system comprising:

one or more computers and one or more storage devices storing instructions that are operable, when executed by the one or more computers, to cause the one or more computers to perform operations comprising:

receiving audio data corresponding to an utterance of a user whose user profile indicates is a first type of user;

after the audio data corresponding to the utterance has been received, classifying the user as the first type of user, then selecting a first set of speech recognition setting values that is associated with users of the first type for use by an automated speech recognizer in generating a transcription of the utterance, the first set of speech setting values being different than a second set of speech recognition setting values that is associated with users of a second type, the first set of speech recognition setting values favoring increased accuracy over reduced latency of the transcriptions that are generated by the automated speech recognizer, and the second set of speech recognition setting values favoring reduced latency over increased accuracy of the transcriptions that are generated by the automated speech recognizer;

dynamically configuring the automated speech recognizer to process the previously-received audio data using the first set of speech recognition setting values;

processing, for recognition, by the dynamically configured automated speech recognizer the previously-received audio data corresponding to the utterance of the user whose user profile indicates is the first type of user;

obtaining, based on the automated speech recognizer using the first set of speech recognition setting values, a transcription of the utterance that is more accurate and is obtained with greater latency than a different transcription of the utterance that would otherwise be obtained were the same audio data processed for the user had the user profile indicated that the user is the second type of user; and providing the obtained transcription for output.

10. The system of claim 9, wherein the first type of user is a novice user.

11. The system of claim 9, wherein the second type of user is an expert user.

12. The system of claim 9, wherein receiving audio data corresponding to an utterance of a user whose user profile indicates is a first type of user comprises:

receiving audio data from a microphone of a mobile computing device.

13. The system of claim 9, wherein processing, for recognition, the audio data corresponding to the utterance of the user whose user profile indicates is the first type of user comprises:

providing the audio data to a speech recognition server.

14. The system of claim 9, wherein obtaining a transcription of the utterance that is more accurate and is obtained with greater latency than a different transcription of the utterance that would otherwise be obtained were the same audio data processed for the user had the user profile indicated that the user is a second type of user is based at least on an indication in the user profile that the user is a first type of user.

15. The system of claim 9, wherein obtaining a transcription of the utterance that is more accurate and is obtained with greater latency than a different transcription of the utterance that would otherwise be obtained were the same audio data processed for the user had the user profile indicated that the user is a second type of user is based at least on an identifier of a mobile computing device that submits the audio data for recognition.

16. The system of claim 9, wherein obtaining a transcription of the utterance that is more accurate and is obtained with greater latency than a different transcription of the utterance that would otherwise be obtained were the same audio data processed for the user had the user profile indicated that the user is a second type of user is based at least on an identifier of the user.

17. A non-transitory computer-readable medium storing software comprising instructions executable by one or more computers which, upon such execution, cause the one or more computers to perform operations comprising:

receiving audio data corresponding to an utterance of a user whose user profile indicates is a first type of user;

after the audio data corresponding to the utterance has been received, classifying the user as the first type of user, then selecting a first set of speech recognition setting values that is associated with users of the first type for use by an automated speech recognizer in generating a transcription of the utterance, the first set of speech setting values being different than a second set of speech recognition setting values that is associated with users of a second type, the first set of speech recognition setting values favoring increased accuracy over reduced latency of the transcriptions that are generated by the automated speech recognizer, and the second set of speech recognition setting values favoring reduced latency over increased accuracy of the transcriptions that are generated by the automated speech recognizer;

dynamically configuring the automated speech recognizer to process the previously-received audio data using the first set of speech recognition setting values;

processing, for recognition, by the dynamically configured automated speech recognizer the previously-received audio data corresponding to the utterance of the user whose user profile indicates is the first type of user;

obtaining, based on the automated speech recognizer using the first set of speech recognition setting values, a transcription of the utterance that is more accurate and is obtained with greater latency than a different transcription of the utterance that would otherwise be obtained were the same audio data processed for the user had the user profile indicated that the user is the second type of user; and providing the obtained transcription for output.

18. The medium of claim 17, wherein the first type of user is a novice user.

19. The medium of claim 17, wherein the second type of user is an expert user.

20. The medium of claim 17, wherein receiving audio data corresponding to an utterance of a user whose user profile indicates is a first type of user comprises:

receiving audio data from a microphone of a mobile computing device.

* * * * *